United States Patent [19]

Teegarden et al.

[11] Patent Number: 5,241,038
[45] Date of Patent: Aug. 31, 1993

[54] METHOD FOR THE PREPARATION OF AROMATIC IMIDE SULFIDE POLYMERS

[75] Inventors: David M. Teegarden, Rochester; Robert J. Perry; S. Richard Turner, both of Pittsford, all of N.Y.; David R. Fagerburg, Kingsport, Tenn.

[73] Assignee: Eastman Kodak Company, Rochester, N.Y.

[21] Appl. No.: 753,599

[22] Filed: Sep. 3, 1991

[51] Int. Cl.⁵ ............................................. C08G 73/12
[52] U.S. Cl. ..................... 528/322; 528/15; 528/25; 528/27; 528/28; 528/33; 528/170; 528/220; 528/229; 528/315; 528/321; 528/374; 528/389
[58] Field of Search ............... 528/322, 321, 315, 374, 528/389, 15, 25, 27, 28, 33, 220, 229, 170

[56] References Cited

U.S. PATENT DOCUMENTS

| | | | |
|---|---|---|---|
| 4,578,470 | 3/1986 | Webb | 546/256 |
| 4,599,396 | 7/1986 | Takekoshi et al. | 528/185 |
| 4,716,216 | 12/1987 | Takekoshi et al. | 528/352 |
| 4,786,713 | 11/1988 | Rule et al. | 528/389 |
| 4,792,600 | 12/1988 | Rule et al. | 528/389 |
| 4,794,162 | 12/1988 | Ostlinning et al. | 528/388 |
| 4,855,393 | 8/1989 | Rule et al. | 528/212 |

FOREIGN PATENT DOCUMENTS

WO90/02149   3/1990   PCT Int'l Appl.

*Primary Examiner*—Harold D. Anderson
*Attorney, Agent, or Firm*—Robert Luke Walker

[57] ABSTRACT

A process for the preparation of aromatic imide sulfide polymers and polymers produced. In the process, elemental sulfur is reacted with a compound having the general formula

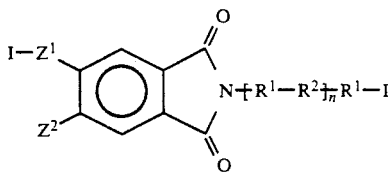

wherein $Z^1$ is a direct link and $Z^2$ is H, or $Z^1$ has the general structure

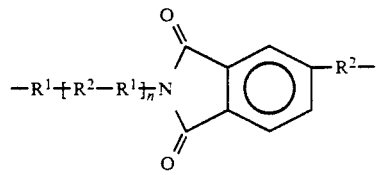

or $Z^1$ and $Z^2$ together complete a moiety having the general structure

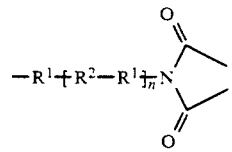

$n=0-4$. $R^1$ is substituted or unsubstituted: aryl or heteroaryl.

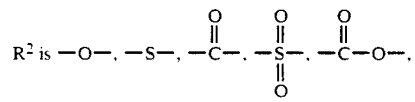

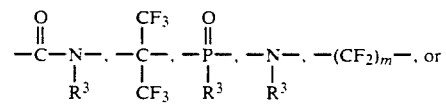

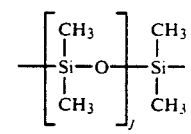

which $R^3$ is an independently selected aryl group, m is an integer from 1 to 12, and j is an integer from 0 to 300.

12 Claims, No Drawings

METHOD FOR THE PREPARATION OF AROMATIC IMIDE SULFIDE POLYMERS

BACKGROUND OF THE INVENTION

The present invention pertains to imide and arylene sulfide polymers and to methods for preparing imide and arylene sulfide polymers and more particularly pertains to methods for the preparation of aromatic imide sulfide polymers and to aromatic imide sulfide polymers.

Poly(phenylene sulfide), also referred to herein as "PPS", is an important commercial polymer with good thermal stability, good flame resistance, and good solvent resistance. Owing to its regular, linear structure and low glass transition temperature, also referred to herein as $T_g$, of about 88 degrees C., PPS readily crystallizes. The low $T_g$ of PPS is detrimental in many desired high temperature applications. PPS is soluble in only a very limited number of solvents and only at elevated temperatures, generally above 200°-250° C. Some applications of PPS take advantage of this chemical resistance, for example in lining pipes and tubes which carry organic solvents or caustic liquids. It would be highly advantageous for other applications, however, to have PPS copolymers which are soluble in common organic solvents at room temperatures or at temperatures between room temperature and 200° C. This would permit, for example, the casting or spin-coating of films of controlled thickness onto various substrates from solution using standard coating technology.

U.S. Pat. No. 4,786,713 to Rule, M. et al discloses a method for producing copoly(arylene sulfide-disulfide) by reacting a mixture of a diiodoaromatic compound and elemental sulfur. U.S. Pat. No. 4,792,600 to Rule, M. et al discloses a similar process utilizing a catalytic amount of an aromatic nitro compound. U.S. Pat. No. 4,794,162 to Ostlinning et al discloses a method for the preparation of high molecular weight polyarylene sulfides from low molecular weight polyarylene sulfides by a reaction with elemental sulfur. PCT Published Application No. WO 90/02149 by Rule, M. et al discloses a method for producing a copolymer of diphenyl ether and arylene sulfide by reacting diiododiphenyl ether, diiodobenzene and sulfur.

Polyimides, which are perhaps the most widely used of the thermally stable polymers, are, with some exceptions, non-crystalline and not melt processable due to very high glass transition temperatures. Polyimides are most commonly formed from imide precursor such as polyamic acids and are cyclized by thermal treatment after solvent processing. U.S. Pat Nos. 4,716,216 and 4,599,396, both to Takekoshi et al., disclose crystalline polyimides and polyetherimides containing phenylene sulfide units produced by reacting oligomers of phenylene sulfide having amino end groups and aromatic tetracarboxylic acid or its functional derivatives or bisimides, including halophenyl bisimides, disclosed in U.S. Pat. No. 4,578,470 to Takekoshi et al. This method provides crystalline polymers having alternating imide and phenylene sulfide groups. A shortcoming of this method is the requirement of preformed diamino phenylene sulfide oligomers.

It is therefore highly desirable to provide improved aromatic imide sulfide polymers and improved methods for the preparation of aromatic imide sulfide polymers.

It is also highly desirable to provide improved aromatic imide sulfide polymers and improved methods for the preparation of aromatic imide sulfide polymers, which provide high glass transition temperatures.

It is also highly desirable to provide improved aromatic imide sulfide polymers and improved methods for the preparation of aromatic imide sulfide polymers, which do not require preformed terminally functional arylene sulfide oligomers.

It is finally highly desirable to provide improved aromatic imide sulfide polymers and improved methods for the preparation of aromatic imide sulfide polymers, which provide all of the above desired features.

SUMMARY OF THE INVENTION

It is an object of the invention to provide improved aromatic imide sulfide polymers and improved methods for the preparation of aromatic imide sulfide polymers.

It is another object of the invention to provide improved aromatic imide sulfide polymers and improved methods for the preparation of aromatic imide sulfide polymers, which provide high glass transition temperatures.

It is another object of the invention to provide improved aromatic imide sulfide polymers and improved methods for the preparation of aromatic imide sulfide polymers, which do not require preformed terminally functional arylene sulfide oligomers.

It is finally an object of the invention to provide improved aromatic imide sulfide polymers and improved methods for the preparation of aromatic imide sulfide polymers, which provide all of the above desired features.

In the broader aspects of the invention there is provided a process for producing a polymer, which includes reacting elemental sulfur, and a compound having the general formula

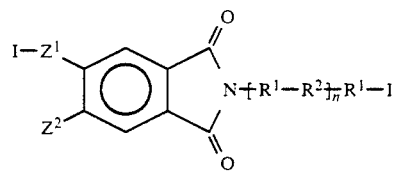

wherein $Z^1$ is a direct link and $Z^2$ is H, or $Z^1$ has the general structure

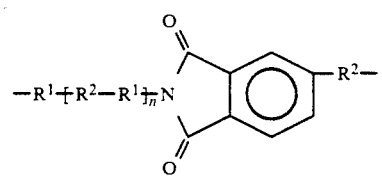

and $Z^2$ is H, or $Z^1$ and $Z^2$ together complete a moiety having the general structure

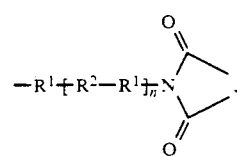

and wherein for the formulas herein, each $R^1$, $R^2$, and n is independently selected, each n is an integer independently selected from 0 to 4, each $R^1$ is a divalent moiety independently selected from the group consisting of substituted and unsubstituted aryl, and substituted and unsubstituted heteroaryl, and each $R^2$ is a divalent moiety independently selected from the group consisting of

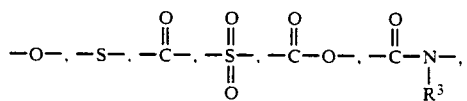

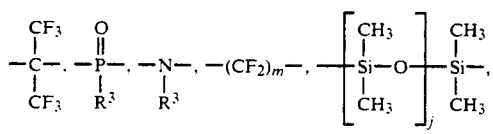

wherein each $R^3$ is an independently selected aryl group, m is an integer from 1 to 12, and j is an integer from 0 to 300, and aromatic imide sulfide polymers which can be provided by that method. The methods and polymers disclosed herein are improvements over the methods and polymers disclosed in U.S. Pat. Nos. 4,786,713, and 4,855,393 to Rule et al, which are incorporated herein by reference. The methods disclosed herein, which use diiodo imide reactant, and the polymers disclosed herein provide novel and unpredictable methods and polymers with surprisingly desirable features such as the observed $T_g$'s.

DESCRIPTION OF A SPECIFIC EMBODIMENT

In the process of the invention, elemental sulfur is reacted with a diiodo imide compound having the general formula

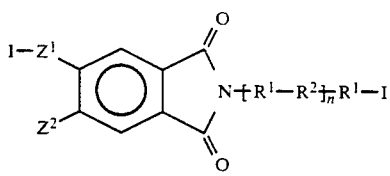

wherein $Z^1$ is a direct link and $Z^2$ is H, or $Z^1$ has the general structure

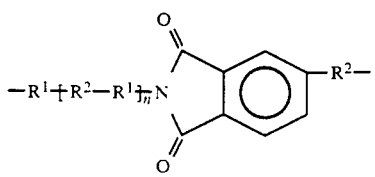

and $Z^2$ is H, or $Z^1$ and $Z^2$ together complete a moiety having the general structure

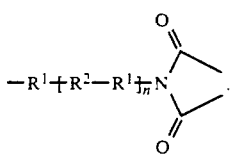

The iodo groups of the diiodo imide compounds are each bonded to an aromatic moiety. Each diiodo imide compound has either a single phthalimide moiety or a pair of phthalimide moieties or a pyromellitimide moiety (which is a pair of phthalimide moieties sharing a single phenyl ring). Bonded to the nitrogen or nitrogens of each phthalimide or pyromellitimide group is the moiety

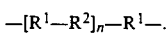

Each $R^1$, $R^2$, and n is independently selected. $R^1$ separates $R^2$ from an imide ring. $R^1$ can be substituted or unsubstituted and can be aryl or heteroaryl. Example $R^1$ groups include: phenyl, biphenyl, naphthalene, anthracene, thiophene, benzothiophene, pyridine, quinoline, furan, dibenzofuran, aromatic sulfones, diarylethers, diarylcarbonyls, diarylsulfides. Substituents on the aromatic compounds may include phenyl, halogen, hydroxy, nitro, amino, alkoxy having from 1 to 6 carbon atoms, and carboxylate and carboxylic acid substituents, as well as aryl sulfones and aryl ketones. Desirable $R^1$ groups are m-phenylene and p-phenylene, which may be unsubstituted or substituted with substituents which are unreactive, that is, substitutents which do not have a deleterious effect, for example steric hindrance or electronic deactivation, on the reaction of the diiodoimide compound in the polymerization reaction.

$R^2$ is a linking group, which in addition to connecting other portions of the molecule can also provide selected functionality. Such functionality cannot react in the polymerization reaction, unless it is specifically desired that such reaction occur, in which case chain branching can occur. The selected functionality cannot seriously deactivate the diiodo imide compound toward reaction in the polymerization reaction, nor interfere with the reaction in any way. $R^2$ is selected from the group consisting of

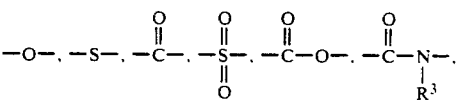

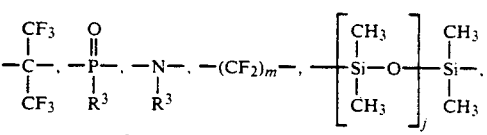

wherein each $R^3$ is an independently selected aryl group, m is an integer from 1-12, and j is an integer between 0 and 300. Desirable $R^2$ groups are ether, thioether, carbonyl, sulfone and hexafluoroisopropylidene.

The —$R^1$—$R^2$— subunit may be repeated. In the formulas above, n is an integer from 0 to 4.

Diiodo imide compounds useful in the invention may be illustrated by the general structural formulas:

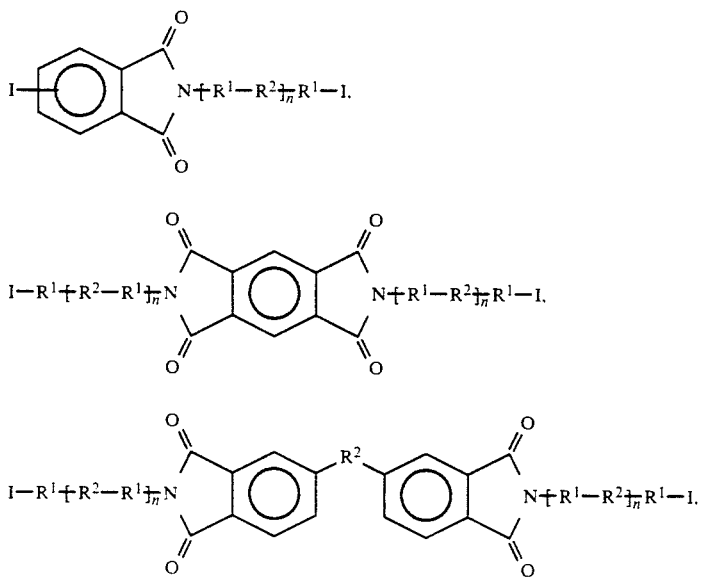

and

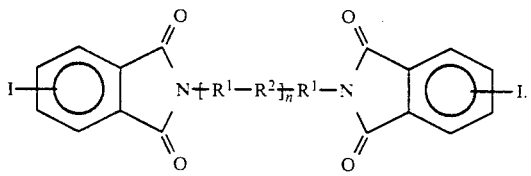

The following procedures exemplify methods for the preparation of diiodoimides having the above-listed general formulas.

Preparation of bis(N-(4-iodophenyl)) pyromellitimide:

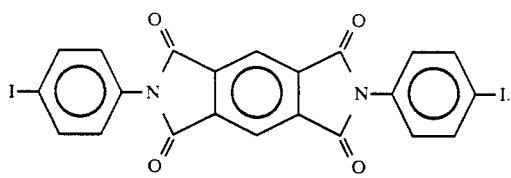

A 300 ml 3-necked round-bottomed flask, equipped with stirrer and condenser, was charged with p-iodoaniline (10 grams, 0.045 mol) followed by N,N-dimethylacetamide (herein also referred to by the term "DMAc") (50 milliliters). The reaction mixture was stirred and heated to about 70 degrees C. Pyromellitic dianhydride (4.91 grams, 0.0225 mol) was added. The reaction mixture was stirred for 10 minutes and pyridine (12.4 grams, 0.16 mol) was added. The reaction was maintained at 70 degrees C. for 30 minutes. Acetic anhydride (18.4 grams, 0.18 mol) was then added dropwise. A yellow precipitate formed within a few minutes. The reaction was then maintained at between 70-80 degrees C. for 4 hours. The reaction mixture was cooled and the precipitate was collected by vacuum filtration. The precipitate was washed three times with fresh portions of diethyl ether (100 milliliters), air dried, and then vacuum dried at 40 degrees C. for 72 hours. The yield was approximately quantitative. The infrared spectrum showed characteristic imide absorptions at 1780 and 1720 cm$^{-1}$ and no absorptions due to non-cyclized product. Differential scanning calorimetry (DSC) indicated decomposition at a temperature in excess of 350° C. Combustion analysis: calculated: C=42.61, H=1.63, N=4.52; measured: C=42.47, H=1.67, N=4.30.

Preparation of bis(N-(3-iodophenyl)) pyromellitimide:

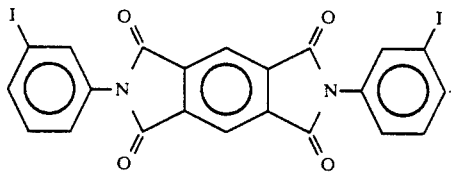

The same procedures were followed and results are presented as in the preparation of bis(N-(4-iodophenyl)) pyromellitimide, with the exception that m-iodoaniline was used in place of p-iodoaniline. Melting point as determined by DSC was in excess of 340° C. Combustion analysis was: calculated: C=42.61, H=1.63, N=4.52; measured: C=42.75, H=1.85, N=4.38.

Preparation of 2,2-bis(4-(N-(4-iodophenyl)phthalimide))hexafluoropropane:

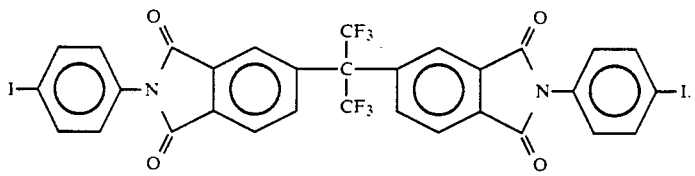

A 1 liter 3-necked round-bottomed flask, equipped with stirrer and condenser, was charged with p-iodoaniline (87 grams, 0.4 mol) followed by DMAc (500 milliliters). The reaction mixture was stirred and heated to 70°–80 degrees C. 2,2-bis(4-phthalic anhydride)hexafluoropropane (89 grams, 0.2 mol) was added as powder. Pyridine (110 grams, 1.39 mol) in 50 milliliters of DMAc was then added. The reaction was maintained at about 70° C. for 30 minutes. Acetic anhydride (166 grams, 1.63 mol) was then added dropwise over a 45 minute period, during which a yellow precipitate formed. The reaction was then maintained at about 70° C. for 4 hours. The product slurry was collected by filtration, washed with water (2 liters) twice, washed with methanol (2 liters) twice, filtered, and then vacuum dried at 40° C. for 72 hours. The yield was approximately 98%. Melting point as determined by DSC was 308°–310° C. IR and proton NMR spectra were consistent with the above structure.

Preparation of 2,2-bis(4-{N-(3-iodophenyl)phthalimide})hexafluoropropane:

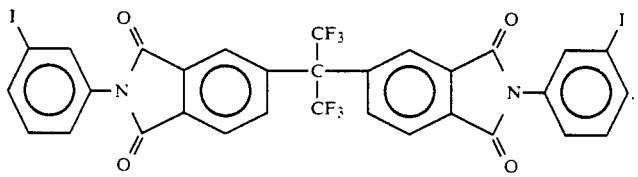

The same procedures were followed and results are presented as in the preparation of 2,2-bis(4-{N-(4-iodophenyl)phthalimide})hexafluoropropane, with the exception that m-iodoaniline was used in place of p-iodoaniline. Conversion to product was at 85%. Melting point as determined by DSC was 242° C.

Preparation of bis(4-{N-(4-iodophenyl)phthalimide})ketone:

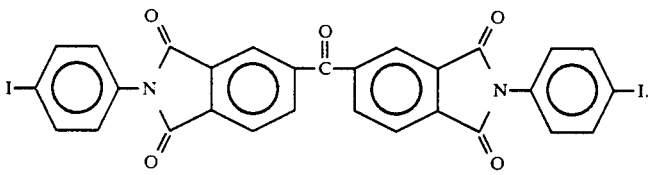

A 1 liter 3-necked round-bottomed flask, equipped with stirrer and condenser, was charged with benzophenone tetracarboxylic acid dianhydride (21.91 grams, 0.068 mol), p-iodoaniline (30.0 grams, 0.137 mol), pyridine (39 milliliters, 0.48 mol) and DMAc (500 milliliters). The reaction mixture was degassed and purged with argon and then heated for 1 hour at 100 degrees C. Acetic anhydride (52 milliliters, 0.55 mol) was then added and the reaction mixture was maintained at 100 degrees for 16 hours. A yellow precipitate formed, was cooled to room temperature and was isolated by filtration. The precipitate was washed with DMAc, then methanol, then dried under vacuum at 90 degrees C. for 4 days. The yield was approximately 81%. Melting point determined by DSC was 430° C. Combustion analysis was: calculated: C=48.09, H=1.95, N=3.87; measured: C=48.65, H=2.14, N=3.87.

Preparation of N-(4-iodophenyl)-4-iodophthalimide:

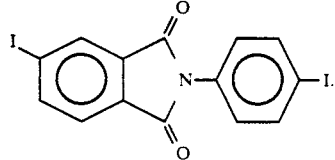

A 100 milliliter round-bottomed flask, equipped with stirrer, was charged with p-iodoaniline (10.95 grams, 0.05 mol) and dimethylacetamide (DMAc) (35 milliliters). 4-iodophthalic anhydride (13.6 grams, 0.05 mol) was added slowly over 10 minutes. The reaction mixture was heated with stirring to a temperature of about 70° C. Pyridine (19.45 grams, 0.25 mol) was added, the reaction mixture was stirred for 15 minutes, then acetic anhydride (11.12 grams, 0.11 mol) was added dropwise over 20 minutes. The reaction mixture was stirred at 70° C. overnight. The reaction mixture was poured into water, producing a white solid product, which was collected by filtration, triturated with methanol (300 milliliters) and dried under vacuum at 60° C. overnight. Melting point, as determined by DSC was 235° C. Combustion analysis was: calculated: C=35.40, H=1.49, N=2.95; measured: C=35.47, H=1.59, N=2.94. Proton NMR was consistent with the above general structure.

Preparation of 4,4'-bis(N-{4-iodophthalimide})diphenylether:

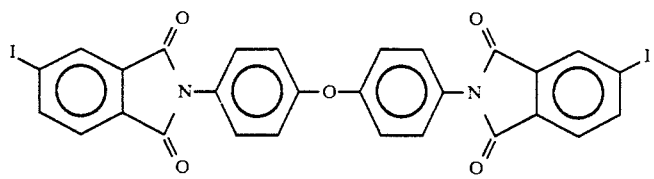

A 100 milliliter round-bottomed flask with a magnetic stirrer was charged with 4,4-oxydianiline (1.0 grams, 5.0 mmoles) and N,N-dimethyl acetamide (DMAc) (4.5 milliliters). 4-iodophthalic anhydride (2.74 grams, 10 mmoles) was added. The reaction solution was heated with stirring on an oil bath to a temperature of about 75° C. Pyridine (4.0 grams) was added, the reaction mixture was stirred for 15 minutes and then acetic anhydride (2.3 grams) was added dropwise over 20 minutes. The reaction was stirred at 75° C. for 3 hours and poured into methanol. The yellow solid product was collected by filtration and triturated with acetone (100 milliliters). The product was dried under vacuum at 60° C. overnight. The yield was 3.21 grams, 90% of theory. Combustion analysis found: N=3.99, C=47.29, H=2.11. Calculated values are: N=3.93, C=47.22, H=1.98. The melting point was determined to be 241°-243° C.

The elemental sulfur reacted is powdered or pulverized or ground and can be in the form of any allotropic modification such as orthorhombic cyclooctasulfur ($S_8$) or any other cyclic elemental sulfur such as the cyclosulfur species having 6 to 12 sulfur atoms. The sulfur may be in any crystalline form. It is believed that the reaction is relatively insensitive to the presence of normal sulfur impurities. This is advantageous in that sulfur having a purity of 98-100%, is widely available and generally less expensive than more highly purified grades of sulfur.

A diiodoaromatic compound can be reacted in the method of the invention as a comonomer to produce aromatic imide sulfide polymers, which are copoly(imide-arylene sulfide)s. The terms "diiodoaromatic compound", "coreactant" and "comonomer" are used herein to refer not to the above-discussed aromatic imide compound, but rather to another compound also reacted in the method of the invention. Suitable diiodoaromatic compounds include substituted or unsubstituted aryls and substituted or unsubstituted heteroaryls, in which heteroatoms are selected from nitrogen, sulfur and oxygen. Example diiodoaromatic compounds include diiodo substituted: benzene, biphenyl, naphthalene, anthracene, thiophene, benzothiophene, pyridine, quinoline, furan, dibenzofuran, aromatic sulfones, diarylethers, diarylcarbonyls, diarylsulfides. These diiodoaromatic compounds may be substituted by one or more groups selected from phenyl, aryl, halo, nitro, alkoxy groups having from 1 to 6 carbon atoms, aryl sulfones, aryl ketones, carboxylate and carboxylic acid substituents. There is no limitation on the spatial arrangement of the substitutents, for example, the substitutents may be on a carbon adjacent to an iodine bearing carbon or may be on a carbon atom further removed from the iodine bearing carbon. Desirable diiodoaromatic compounds are diiodobenzenes, diiodonaphthalenes, diiodobiphenyls, and diiododiphenyl ethers; which may be unsubstituted or substituted with any of the substituents above noted.

The method of the invention can be conducted in the presence of a catalyst to enhance the rate of reaction. Catalysts useful in the method of the invention are disclosed in U.S. Pat. No. 4,792,600 to Rule et al. That patent describes a catalyst which is an aromatic compound containing a nitro group and is preferably either substituted or unsubstituted benzene or naphthalene. Substituents are selected from aryl containing 6 to 20 carbon atoms, or bromine, chlorine or iodine, with iodine being preferred. In the method of the invention, preferred catalysts are 2,4-diiodo-1-nitrobenzene or 3,5-diiodo-1-nitrobenzene.

A catalytic amount of catalyst is employed. By "catalytic amount" is meant an amount of catalyst which catalyzes the reaction to a desired extent. A convenient enhancement in the rate of reaction can be produced by at least 0.001 mole percent catalyst, based upon total diiodo aromatic species (diiodo imide and any comonomer) used. A more convenient enhancement in the rate of reaction can be produced by catalyst in the range of 0.05 to 0.5 mole percent based upon total diiodo aromatic species used. In most catalysed reactions, there is no real upper limit on the amount of catalyst, except as defined by secondary considerations such as cost. In the method of the invention, secondary considerations, such as cost, still apply, however, an additional consideration is the incorporation of the catalyst within the polymer produced and the effect of the catalyst on the characteristics of the polymer. An effective upper limit on the amount of catalyst used is an undesirable change in the characteristics of the polymer.

The formation of aromatic imide sulfide polymer in the method of the invention is not sensitive to the relative stoichiometry of the diiodo aromatic species and sulfur. Accordingly, an excess of sulfur or an excess of diiodo aromatic species may be used in the polymerization process. When excess sulfur is used, some disulfide linkages are observed in the polymer. Decreasing amounts of sulfur result in decreasing levels of disulfide linkages in the polymer. Polymerization to high polymer can still occur, with diiodo aromatic species present in excess, if excess diiodo aromatic species is removed during final polymerization.

The polymerization reaction is preferably carried out in the absence of solvent by merely heating and reacting the sulfur and diiodo aromatic species. Under these conditions, the diiodo aromatic species act as solvent for the sulfur and a substantially homogeneous solution is formed enabling the formation of random copolymer and complete reaction. In this preferred embodiment of the method of the invention, high melting point diiodo imides, which are difficult to dissolve in the molten reaction mixture, are not preferred. Examples 13 and 14 illustrate the difficulties presented by use of such high melting point diiodo imides in the embodiment of the method of the invention in which the reaction is carried out in the absence of solvent.

The polymerization reaction can be conducted in the presence of solvent which appreciably dissolves reactants to provide a liquid reaction medium, and facilitates interaction of the reactants. It is desirable that the solvent be "inert" to the reaction, i.e., that the solvent not enter into the reaction in an undesired way. It is desirable that the solvent have a high boiling temperature so that elevated temperatures may be used in the reaction. The invention is not limited to a particular solvent or solvent system and a variety of solvents can be used. Suitable solvents include aromatic hydrocarbons, diarylsulfides, diarylethers and diarylsulfones.

It is also possible to perform the polymerization reaction of the present invention by solid state polymerization. Solid state polymerization enables very high molecular weights and melt viscosities to be achieved. After an initial melt polymerization or solution polymerization has been performed, the product is isolated in a solid state. Further heating and polymerization in the solid state under vacuum or inert gas flow dramatically increases the molecular weight allowing weight average molecular weights in excess of 100,000 to be achieved. It is significant to note that substantially no cross-linking occurs during the solid state or melt polymerization processes. The very high molecular weight copolymers which are produced after the solid state polymerization are still substantially linear and have excellent film and fiber forming properties.

During the polymerization reaction between the diiodoaromatic species and sulfur, elemental iodine is produced and evolves from the reaction melt, solution, or solid. Removal of the elemental iodine provides a driving force for completion of the polymerization reaction. The iodine may be removed by passing a stream of air or an inert gas such as nitrogen or argon over or through the reaction mass at atmospheric or Buperatmospheric pressure or alternatively by applying a vacuum to the reaction apparatus. The elemental iodine may be collected for some other use.

Generally, one selects a reaction temperature which affords a reasonable rate of reaction and which does not give an undue amount of decomposition of products or reactants. The polymerization reaction is generally conducted at a temperature above about 230° C. Although the reaction may be conducted at temperatures below 230° C., the polymerization reaction is much slower. The upper temperature limit on the polymerization reaction is the decomposition temperature of the diiodo imide compound or of the coreactant, if any, or of the reaction products with sulfur. A suitable temperature range is 230°-350° C.

The reaction time is not a truly independent variable but is dependent at least to some extent on the other reaction parameters selected such as the reactivity of the diiodo imide compound, amount of catalyst, reaction temperature, physical properties of the desired product and so forth. Generally, reaction times within the range of from about 0.5 to about 10 hours are used, however, reaction times approaching infinity are theoretically possible.

Agitation of the reaction mixture is optional, however agitation assists in the production and yield of the polymer. Agitation of the reaction mixture may be accomplished by any known method, such as mechanical stirring.

The polymerization reaction has been carried out in a batch reaction vessel. It is proposed that the polymerization reaction could be carried out as a continuous or semi-continuous process. It is further proposed that it might be preferred that the polymerization reaction would be conducted on a continuous basis with the diiodo imide and sulfur being combined in a continuous staged reactor to form a reaction melt. In that continuous process, an inert gas, such as nitrogen or argon could be passed though the melt, preferably in a countercurrent direction, thereby accomplishing agitation and mixing of the reaction melt and at the same time removing the elemental iodine evolved. Alternatively, in that continuous process, a vacuum could be applied to the reactor to remove the elemental iodine as it is generated.

The aromatic imide sulfide polymers of the invention have the general formula

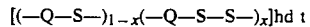

in which x is in the range of 0.5 to 0.001 and Q is a divalent aryl moiety, that is, Q represents moieties contributed by both the diiodo imide reactant and any diiodoaromatic coreactant. Degradation of corresponding poly(phenylene sulfides) indicates that disulfide linkages are present on a random basis. In the aromatic imide sulfide copolymers of the invention, only one $T_g$ is observed for each composition, and for each series of copolymers containing a specific imide comonomer, the $T_g$ increases in a regular fashion as a function of weight percent imide in the copolymer. This is indicative that divalent moieties from the diiodo imide reactant.

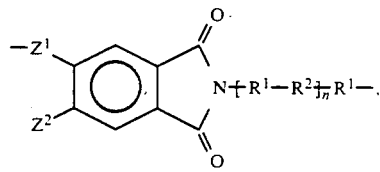

wherein $Z^1$, $Z^2$, $R^1$, $R^2$, and n represent the same as above discussed, and divalent moieties from the diiodoaromatic coreactant are present on a random basis. This explanation corresponds to the observed characteristics of the claimed inventions, however, the claimed inventions, are not limited by explanation or theory except as specifically claimed.

Aromatic imide sulfide polymers produced by the method of this invention are useful for preparation of thermoplastics for high temperature applications such as engineering plastics, fibers and films.

Although reactants are discussed herein as individual compounds, this invention is not limited to individual compounds as reactants, but is laos inclusive of reactions utilizing mixtures of compounds as reactants. It is desirable that the reactants be sufficiently stable under the reaction conditions employed and that the reactants not be subject to an unacceptable amount of undesirable side reactions, to prevent the formation of an unacceptable amount by-product. It is also desirable that the reactants be free of groups which unduly retard the reaction, for example, by steric or electronic effects or by lowering the activity of the catalyst.

The following examples are presented for a further understanding of the invention:

EXAMPLE 1

A 250 ml 3-necked round-bottomed flask, was charged with finely divided sulfur (16.0 grams, 0.500 mol), 1,4-diiodobenzene (184.2 grams, 0.558 mol), 2,2-bis[4-(N-(4-iodophenyl)phthalimide)]hexafluoropropane (52.5 grams, 0.062 mol), and 2,4-diiodo-1-nitrobenzene (0.4 grams, 0.001 mol). The flask was fitted with a 350 millimeter Vigreux column, a mechanical stirrer, and an inlet tube for a slow air sweep. The column was attached via a distillation head and takeoff tube to a distillation receiver, which was cooled in dry ice. The receiver was connected to a vacuum source. The flask was immersed in a metal bath and maintained at 240° C. and 200 torr pressure for 2.5 hours. At the end of that time the bath temperature was raised to 245° C. and that temperature was maintained. After 1.5 hours, the pressure was reduced to 120 torr and maintained for 0.5 hours. The pressure was then reduced to 60 torr and maintained for 0.5 hours. The pressure was then reduced to 30 torr and maintained for 0.5 hours. At that time the pressure was reduced to 0.05 torr and the bath temperature was raised to 254° C. and the air bleed was turned off. After 1.0 hours, the temperature was raised to 305° C. and maintained for 0.5 hours. The melt viscosity was observed to be quite high. The reaction flask was then removed from the bath, repressurized with nitrogen and allowed to cool under nitrogen. A black, glassy material was obtained, which was then ground in a Wiley mill through a 6 millimeter screen. Results of Fourier transform infrared spectroscopy (FTIR spectra) were obtained directly on either thin films or by photoacoustic spectroscopy on powders of the copolymers using a Bio-Rad (Digilab Division) FTS-7 spectrometer with a resolution of 4 cm$^{-1}$ and 2048 scans per sample. FTIR spectra showed bands associated with PPS as well as new bands assigned to the imide moieties (1715 and 1780 (C=O); 1200-1250 (C-F)). Results of differential scanning calorimetry ($T_g$ was taken as midpoint in specific heat change on second cycle at 20° C. per minute heating rate) and elemental analysis/combustion analysis are presented in Table 1. Solubility tests are presented in Table 2. Solubility data for pure polyphenylene sulfide prepared as disclosed in U.S. Pat. No. 4,792,600 to Rule, M. are included for comparison. Proton and carbon 13 nuclear magnetic resonance spectra of this polymer using a Varian NMR spectrometer and THF-d$_8$, confirmed the integrity of the diimide moiety in the polymerization reaction, the complete disappearance of absorption arising from the carbon bearing iodine (at 94 ppm) and new peaks consistent with the incorporation of the diiodo imide monomer in a random arylene sulfide copolymer with diiodobenzene. A structural formula for the imide monomer incorporated in the aromatic imide sulfide polymer of this example is designated I in Table 3.

EXAMPLE 2

The same procedures were followed and results are presented as in Example 1, with the exception that the flask was charged with 2,2-bis[4-(N-(4-iodophenyl)phthalimide)]hexafluoropropane (22.7 grams, 0.0268 mol) and the amount of 1,4-diiodobenzene necessary to make a total of 0.620 moles of diiodoaromatic species. FTIR analysis was identical to that of Example 1, except that the relative absorbances of the peaks ascribed to the imide moieties were considerably lower. The incorporated imide monomer is designated I in Table 3. A $T_m$ of 180°–185° C. was observed by DSC.

EXAMPLE 3

The same procedures were followed and results are presented as in Example 2, with the exception that the flask was charged with N-(4-iodophenyl)-4-iodophthalimide (29.6 grams, 0.062 mol) and 1,4 diiodobenzene (184.2 grams, 0.558 mol). The incorporated imide monomer is designated II in Table 3. FTIR spectra included carbonyl bands ascribed to the imide moieties at 1770 cm$^{-1}$ and 1725 cm$^{-1}$.

EXAMPLE 4

The same procedures were followed and results are presented as in Example 2, with the exception that the flask was charged with N-(4-iodophenyl)-4-iodophthalimide (14.7 grams, 0.031 mol) and 1,4 diiodobenzene (194.7 grams, 0.590 mol). The incorporated imide monomer is designated II in Table 3. FTIR spectra included carbonyl bands ascribed to the imide moieties at 1770 cm$^{-1}$ and 1725 cm$^{-1}$.

EXAMPLE 5

The same procedures were followed and results are presented as in Example 2, with the exception that the flask was charged with N-(4-iodophenyl)-4-iodophthalimide (44.2 grams, 0.093 mol) and 1,4 diiodobenzene (173.8 grams, 0.527 mol). The incorporated imide monomer is designated II in Table 3. FTIR spectra included carbonyl bands ascribed to the imide moieties at 1770 cm$^{-1}$ and 1725 cm$^{-1}$.

EXAMPLE 6

The same procedures were followed and results are presented as in Example 2, with the exception that the flask was charged with N-(4-iodophenyl)-4-iodophthalimide (59.5 grams, 0.125 mol) and 1,4 diiodobenzene (163.8 grams, 0.496 mol). The incorporated imide monomer is designated II in Table 3. FTIR spectra included carbonyl bands ascribed to the imide moieties at 1770 cm$^{-1}$ and 1725 cm$^{-1}$.

EXAMPLE 7

The same procedures were followed and results are presented as in Example 2, with the exception that the flask was charged with 2,2-bis[4-(N-(4-iodophenyl)phthalimide)]hexafluoropropane (79.0 grams, 0.093 mol) and 1,4 diiodobenzene (174.3 grams, 0.528 mol). The incorporated imide monomer is designated I in Table 3.

The same procedures were followed and results are presented as in Example 2, with the exception that the flask was charged with 2,2-bis[4-(N-(4-iodophenyl)phthalimide)]hexafluoropropane 93.2 grams, 0.110 mol) and 1,4 diiodobenzene (145.7 grams, 0.442 mol). The incorporated imide monomer is designated I in Table 3.

EXAMPLE 9

The same procedures were followed and results are presented as in Example 2, with the exception that the flask was charged with bis[4-(N-(4-iodophenyl)phthalimide)]ether (22.5 grams, 0.032 mol) and 1,4-diiodobenzene (195.0 grams, 0.591 mol). The incorporated imide monomer is designated III in Table 3.

EXAMPLE 10

The same procedures were followed and results are presented as in Example 2, with the exception that the flask was charged with bis[4-(N-(4-iodophenyl)phthalimide)]sulfone (23.6 grams, 0.031 mol) and 1,4 diiodobenzene (194.6 grams, 0.590 mol). The incorporated imide monomer is designated IV in Table 3.

EXAMPLE 11

The same procedures were followed and results are presented as in Example 2, with the exception that the flask was charged with bis[4-(N-(4-iodophenyl)phthalimide)] ether (66.2 grams, 0.093 mol) and 1,4 diiodobenzene (173.8 grams, 0.527 mol). The incorporated imide monomer is designated III in Table 3.

EXAMPLE 12

The same procedures were followed and results are presented as in Example 2, with the exception that the flask was charged with bis[4-(N-(4-iodophenyl)phthalimide)] ether (88.3 grams, 0.124 mol) and 1,4 diiodobenzene (163.6 grams, 0.496 mol). The incorporated imide monomer is designated III in Table 3.

EXAMPLE 13

The same procedures were followed and results are presented as in Example 2, with the exception that the flask was charged with bis[4-(N-(4-iodophenyl)phthalimide)] ketone (22.4 grams, 0.031 mol) and 1,4 diiodobenzene (194.3 grams, 0.589 mol). The diiodo imide did not appear to dissolve in the reaction mixture and little incorporation of the imide monomer (designated V in Table 3) into the polymer was seen. DSC revealed two melting peaks, one at 252° C., and one at 398° C. The latter peak is close to the melting point of the pure diiodo diimide monomer, 430° C.

EXAMPLE 14

The same procedures were followed and results are presented as in Example 2, with the exception that the flask was charged with bis[4-(N-(4-(4'-iodophenoxy)-phenyl)phthalimide)] ketone (28.2 grams, 0.031 mol) and 1,4 diiodobenzene (194.5 grams, 0.590 mol). The diiodo imide appeared to dissolve partially in the reaction mixture, but little incorporation of the imide monomer (designated VI in Table 3) into the polymer was seen. DSC revealed two melting peaks, one at 265° C., and one at 362° C. The latter peak is close to the melting point of the pure diiodo diimide monomer, 377° C.

Following the procedures of Examples 1-14 additional examples of the aromatic imide sulfide polymers could be produced from the diiodo imides for which preparation procedures were specifically discussed above, with or without coreactant. The aromatic imide sulfide polymers that would be produced would have the general formula presented above and would incorporate the imides without change from the structural formulas shown above, except for removal of the iodo groups.

TABLE 1

AROMATIC IMIDE SULFIDE POLYMERS: IMIDE MONOMER INCORPORATION AND $T_g$

| Example | Incorporation (mole fraction of imide monomer in polymer, as determined from elemental analysis data) | Tg (in °C., at midpoint of second heating cycle) |
|---|---|---|
| 1 | 0.12 | 151 |
| 2 | 0.075 | 123 |
| 3 | 0.14 | 126 |
| 4 | 0.06 | 111 |
| 5 | 0.18 | 142 |
| 6 | 0.24 | 147 |
| 7 | 0.18 | 161 |
| 8 | 0.23 | 166 |
| 9 | 0.06 | 122 |
| 10 | 0.06 | 132 |
| 11 | 0.17 | 140 |
| 12 | 0.24 | 182 |
| 13 | <0.02 | 108 |
| 14 | <0.02 | 107 |

TABLE 2

SOLUBILITY OF 5% WEIGHT/VOLUME SOLUTIONS OF PPS AND IMIDE-PPS COPOLYMERS

| SOLVENT | PPS[3] | EXAMPLES[4] | | | | | |
|---|---|---|---|---|---|---|---|
| | | 1 | 2 | 3 | 9 | 11 | 12 |
| 1,1,1-trichloroethane | | | | | | | |
| hot[1] | i | — | — | p | sw | s | s |
| room temperature[2] | i | — | — | p | sw | i | s[5] |
| pyridine | | | | | | | |
| hot[1] | i | s | s | p | p | s | s |
| room temperature[2] | i | p | s | i | i | i | g |
| N,N-dimethylformamide | | | | | | | |
| hot[1] | i | sw | ssw | p | p | s | s |
| room temperature[2] | i | sw | ssw | i | i | i | i |
| N,N-dimethylacetamide | | | | | | | |
| hot[1] | i | s | ssw | i | sw | p | s |
| room temperature[2] | i | p | ssw | i | sw | i | i |
| N-methylpyrrolidone | | | | | | | |
| hot[1] | s | s | s | s | s | s | s |
| room temperature[2] | i | s | s | s-i | i | s-g | s |
| N-cyclohexylpyrrolidone | | | | | | | |
| hot[1] | s | s | s | s | s | s | s |
| room temperature[2] | i | g | s | s | s | i | s |
| N-methylcaprolactam | | | | | | | |
| hot[1] | s | s | s | s | s | s | s |
| room temperature[2] | i | s | s | s-i | i | i | s |
| 1-chloronaphthalene | | | | | | | |
| hot[1] | s | s | s | s | i | — | — | — |
| room temperature[2] | i | s | s | i | — | — | — |
| biphenyl | | | | | | | |
| hot[1] | s | s | s | i | — | — | — |
| room temperature[2] | i | s | s | i | — | — | — |
| tetrahydrofuran | | | | | | | |
| hot[1] | i | i | s | i | — | — | — |
| room temperature[2] | i | i | s | i | — | — | — |

[1]A temperature up to 175° C. for Examples 1-3, 9, 11-12 and a temperature of 200-250° C. for PPS.
[2]Approximately 20° C.
[3]Produced by the method of U.S. Pat. No. 4,792,600 to Rule et al.
[4]Abbreviations: g = gel forms on cooling, i = insoluble, p = partially soluble, s = soluble, s-g = gel forms after standing at room temperature one or more days, s-i = precipitate forms after standing at room temperature one or more days, sw = swells, and ssw = slightly swells.
[5]Soluble at 15% weight/volume at room temperature.

TABLE 3
STRUCTURAL FORMULAS OF IMIDE MONOMER UNITS IN POLYMERS

| Designation | |
|---|---|
| I | (structure with two phthalimide units linked by C(CF₃)₂) |
| II | (methyl-substituted phthalimide on phenyl) |
| III | (two phthalimide units linked by O) |
| IV | (two phthalimide units linked by SO₂) |
| V | (two phthalimide units linked by C=O) |
| VI | (two phthalimide units linked by C=O, with phenoxyphenyl end groups) | while specific embodiments of the invention have been shown and described herein for purposes of illustration, the protection afforded by any patent which may issue upon this application is not strictly limited to a disclosed embodiment; but rather extends to all modifications and arrangements which fall fairly within the scope of the claims which are appended hereto:

What is claimed is:

1. A process for producing a polymer comprising reacting, elemental sulfur, and a diiodo imide reactant having the general formula

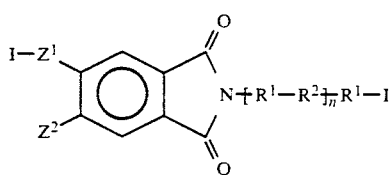

wherein
$Z^1$ is a direct link and $Z^2$ is H,
or $Z^1$ has the general structure

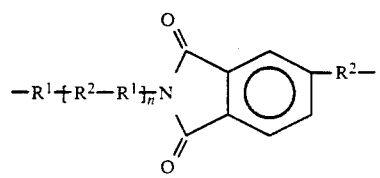

and $Z^2$ is H, or $Z^1$ and $Z^2$ together complete a moiety having the general structure

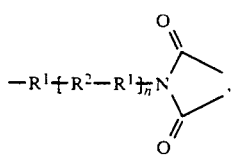

and wherein for the formulas herein, each $R^1$, $R^2$, and n is independently selected, each n is an integer independently selected from 0 to 4, each $R^1$ is a divalent moiety independently selected from the group consisting of substituted and unsubstituted arylene, and substituted and unsubstituted heteroarylene, and each $R^2$ is a divalent moiety independently selected from the group consisting of

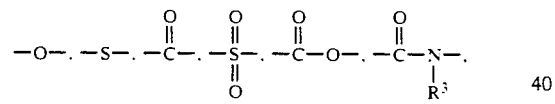

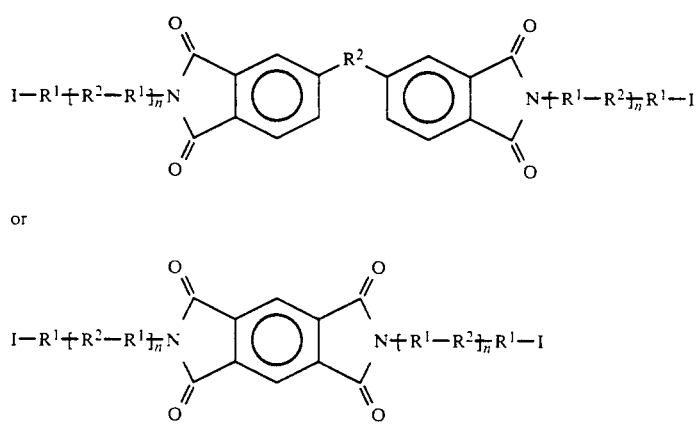

wherein each $R^3$ is an independently selected aryl group, m is an integer from 1-12, and j is an integer between 0 and 300.

2. The process of claim 1 further comprising removing evolved iodine.

3. The process of claim 1 further comprising maintaining a reduced pressure during said reacting.

4. The process of claim 3 wherein the pressure is maintained at less than about 400 torr.

5. The process of claim 1 comprising reacting at an elevated temperature.

6. The process of claim 5 comprising reacting at a temperature between about 230 degrees C. and about 350 degrees C.

7. The process of claim 1 comprising reacting in the absence of additional solvent and wherein said diiodo imide reactant has a melting point below about 350° C.

8. The process of claim 1 further comprising reacting a coreactant having the general formula $$I-R^4-I$$

wherein $R^4$ is a divalent moiety independently selected from the group consisting of substituted and unsubstituted arylene, and substituted and unsubstituted heteroarylene, with the proviso that only said diiodo imide reactant is represented by the general formula

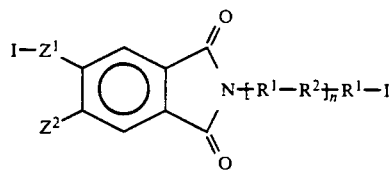

9. A process for producing a polymer comprising reacting elemental sulfur and a compound having the general formula

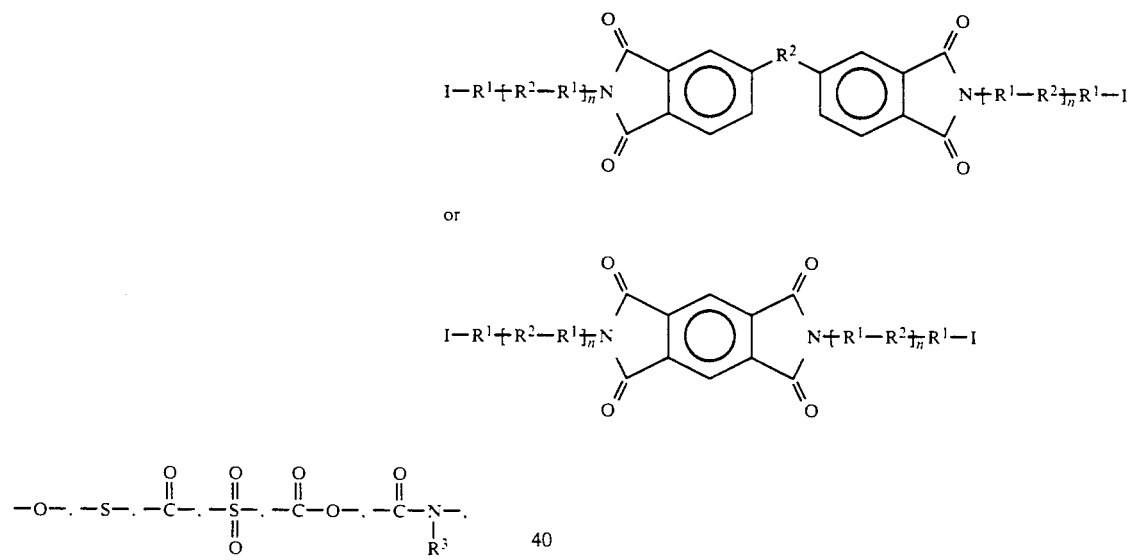

or wherein for the formulas herein, each $R^1$, $R^2$, and n is independently selected, n is an integer from 0 to 4, each $R^1$ is a divalent moiety independently selected from the group consisting of substituted and unsubstituted arylene, and substituted and unsubstituted heteroarylene, and each $R^2$ is a divalent moiety independently selected from the group consisting of

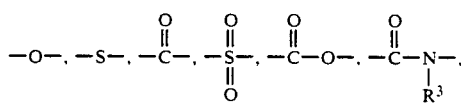

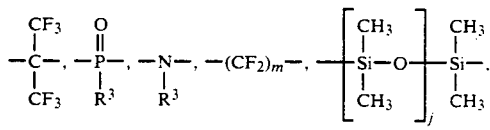

wherein each $R^3$ is an independently selected aryl group, m is an integer from 1-12, and j is an integer between 0 and 300.

10. A process for producing a polymer comprising reacting, elemental sulfur, and a compound having the general formula

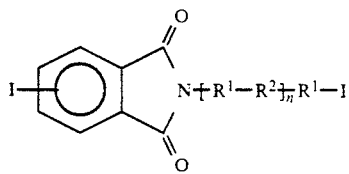

wherein for the formulas herein, each $R^1$, $R^2$, and n is independently selected, n is an integer from 0 to 4, each $R^1$ is a divalent moiety independently selected from the group consisting of substituted and unsubstituted arylene, and substituted and unsubstituted heteroarylene, and each $R^2$ is a divalent moiety independently selected from the group consisting of

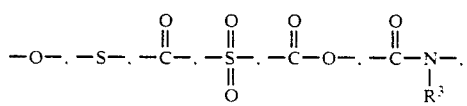

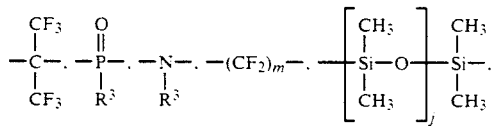

wherein each $R^3$ is an independently selected aryl group, m is an integer rom 1-12, and j is an integer between 0 and 300.

11. A process for producing a copoly(imidearylene sulfide) comprising reacting. elemental sulfur, and a compound having the general formula

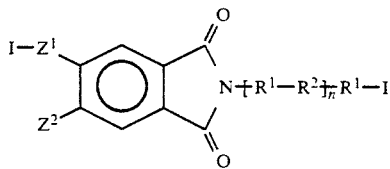

wherein $Z^1$ is a direct link and $Z^2$ is H, or $Z^1$ has the general structure

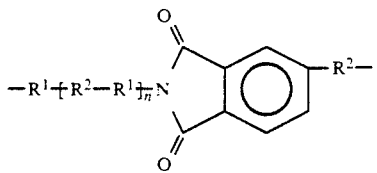

and $Z^2$ is H, or $Z^1$ and $Z^2$ together complete a moiety having the general structure

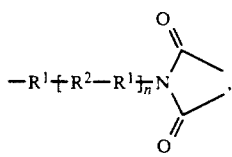

and wherein for the formulas herein, each $R^1$, $R^2$, and n is independently selected, each n is an integer independently selected from 0 to 4, each $R^1$ is a divalent moiety independently selected from the group consisting of substituted and unsubstituted arylene, and substituted and unsubstituted heteroarylene, and each $R^2$ is a divalent moiety independently selected from the group consisting of

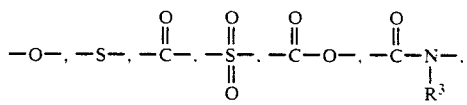

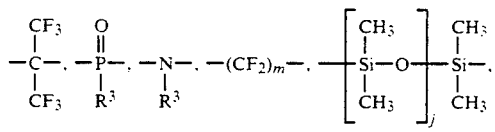

wherein each $R^3$ is an independently selected aryl group, m is an integer from 1-12, and j is an integer between 0 and 300.

12. The process of claim 11 wherein said copoly(imide-arylene sulfide) is represented by repeating units having the general formula

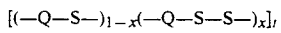

wherein Q is

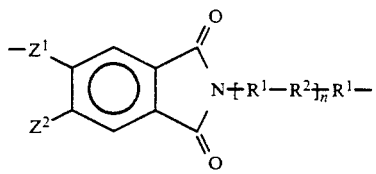

and x is in the range of 0.5 to 0.001 and t is at least 50.

* * * * *